United States Patent
Wang et al.

(10) Patent No.: US 9,658,913 B2
(45) Date of Patent: May 23, 2017

(54) METHOD FOR CONTINUOUS OPERATION OF CONTROLLER FUNCTIONALITY DURING TRANSIENT FRAME OVERRUN

(71) Applicant: GM GLOBAL TECHNOLOGY OPERATIONS LLC, Detroit, MI (US)

(72) Inventors: Shige Wang, Northville, MI (US); Chang Liu, Ann Arbor, MI (US); Joseph G. D'Ambrosio, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 14/696,834

(22) Filed: Apr. 27, 2015

(65) Prior Publication Data
US 2016/0314031 A1 Oct. 27, 2016

(51) Int. Cl.
*G06F 11/00* (2006.01)
*G06F 11/07* (2006.01)

(52) U.S. Cl.
CPC ........ *G06F 11/076* (2013.01); *G06F 11/0721* (2013.01)

(58) Field of Classification Search
CPC ................. G06F 11/076; G06F 11/0721
USPC ..................................................... 714/4.2
See application file for complete search history.

(56) References Cited

U.S. PATENT DOCUMENTS

| | | | |
|---|---|---|---|
| 5,388,261 A * | 2/1995 | Anderson | G06F 9/4881 715/201 |
| 5,440,741 A | 8/1995 | Morales et al. | |
| 5,943,232 A | 8/1999 | Gehi et al. | |
| 6,542,950 B1 | 4/2003 | Bodnar | |
| 7,610,377 B2 | 10/2009 | Petit | |
| 2003/0009508 A1* | 1/2003 | Troia | G06F 9/4881 718/107 |
| 2005/0235085 A1* | 10/2005 | Ichinose | G06F 9/4887 710/200 |
| 2006/0200795 A1* | 9/2006 | MacLay | G06F 9/455 717/106 |

* cited by examiner

*Primary Examiner* — Yair Leibovich
(74) *Attorney, Agent, or Firm* — Quinn IP Law

(57) ABSTRACT

A method of adaptively reconfiguring controller functions during a frame overrun. A frame overrun condition is detected. A respective task from a plurality of tasks is identified as a largest contributor to the frame overrun. A mode associated with the identified task is identified to correct the frame overrun. Functions are reallocated within the identified task to one or more other tasks until the frame overrun condition is corrected. Respective functions reallocated are identified as a function of the identified mode.

18 Claims, 3 Drawing Sheets

METHOD FOR CONTINUOUS OPERATION OF CONTROLLER FUNCTIONALITY DURING TRANSIENT FRAME OVERRUN

BACKGROUND OF INVENTION

The present teachings relate to controller functionality.

Failure faults in controllers require fast responses to correct the fault to continue operations, particularly critical and safety operations. A frame overrun occurs when the processing delay of a signal exceeds its sampling period on the controller and is identified as a controller fault. Under such conditions, the system will either try to shut down to prevent undesired behavior related to the belated control command or reset the controller in hope to recover from the fault.

Under a shut down condition, the controller is shut down and the feature is no longer available while the fault is occurring; however, if the feature is a critical operation, then a shut down condition would not be a preferable option as the feature is required for continued operation of the vehicle.

Under a reset condition, the system must await until the controller resets itself. In a reset condition, there is a duration of time where the controller functionality is unavailable. Functionality of the controller being unavailable during any duration of time with respect to critical/safety features is unwanted, as even in a fail condition, the controller should be fail-operational. Therefore, there needs to be a method to continue functionality during frame overrun to continue operations.

SUMMARY OF INVENTION

An advantage of an embodiment is an uninterrupted operation of features controlled by a controller during a frame overrun condition. The technique identifies the task affecting the frame overrun the most from the plurality of tasks and reallocates functions within the task to other tasks for while the frame overrun condition having a slower cycle time than the task causing the overrun condition. As a result, the task causing the frame overrun condition is allowed to correct itself by completing functions within its expected working cycle since some of its respective functions are being temporarily executed within other tasks running at a slower rates allowing this respective task to maintain its expected working cycle. Tasks will continue to reallocate functions until the frame overrun condition is corrected. After correction, each task will be restored to its original configuration.

An embodiment contemplates a method of adaptively reconfiguring controller functions during a frame overrun. A frame overrun condition is detected. A respective task from a plurality of tasks is identified as a largest contributor to the frame overrun. A mitigation mode associated with the identified task is identified to correct the frame overrun. Functions within the identified task are reallocated to a second task until the frame overrun condition is corrected. The reallocated functions within the respective task are identified as a function of the identified mode.

DETAILED DESCRIPTION

Figure 1:
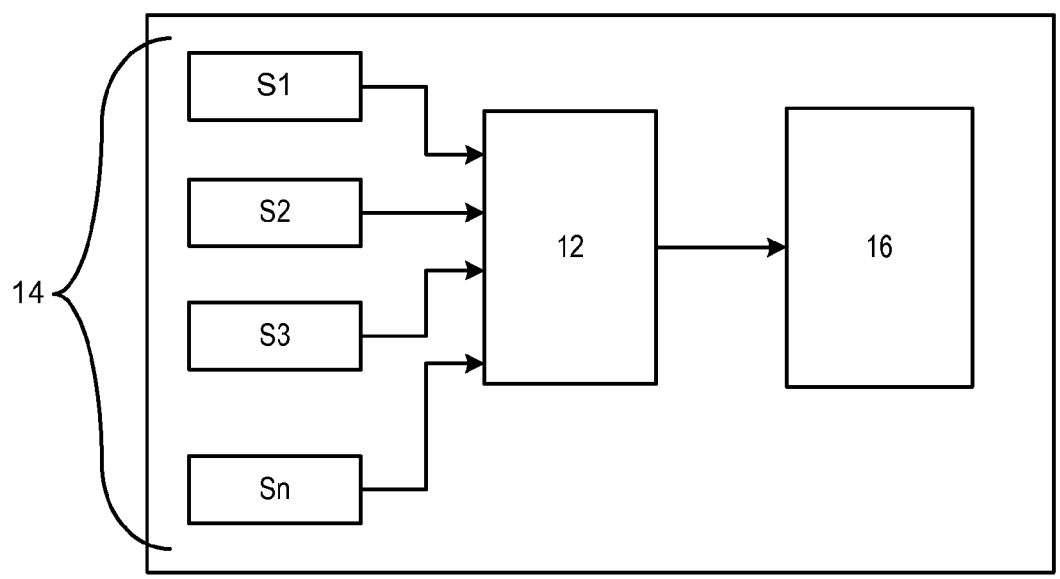
FIG. 1 is an exemplary general block diagram of a control system architecture.

FIG. 1 illustrates a general block diagram of an exemplary control system. The system includes a controller 12 that receive data signals from a plurality of sensors 14. Based on data signals received from the plurality of sensors 14, the controller 12 outputs control signals to actuators 16. The actuators 16 thereafter modify vehicle functionality according to the control signal transmitted controller 12.

A frame overrun is a condition when the controller 12 experiences the processing time longer than the data refreshing period and cannot process the incoming data at the rate the data is being supplied to the controller 12. This may occur when operating conditions of the vehicle (e.g., engine speed) lead to control computation increases thereby increasing in the number of reads demanded by the controller which may push other lower priority computations experiencing longer processing delay be beyond as the processing capability of the controller 12 is reached. The condition may also occur when temperature of a processor heats up within the controller 12 and the processing capabilities decrease. Under either condition, the controller 12 either shuts down, resets itself, or times out where functions are dropped within a respective task. Under such conditions, functionality of the feature is either permanently or temporarily lost. For example, if a frame overrun occurs where the function within the task affects an acceleration of a vehicle, then an acceleration demand by the driver may be ignored if the function is one that is dropped by the task due to the frame overrun. This can lead to customer dissatisfaction or bringing the vehicle in for service since the driver is under the assumption that the vehicle is not operating properly.

Figure 2:
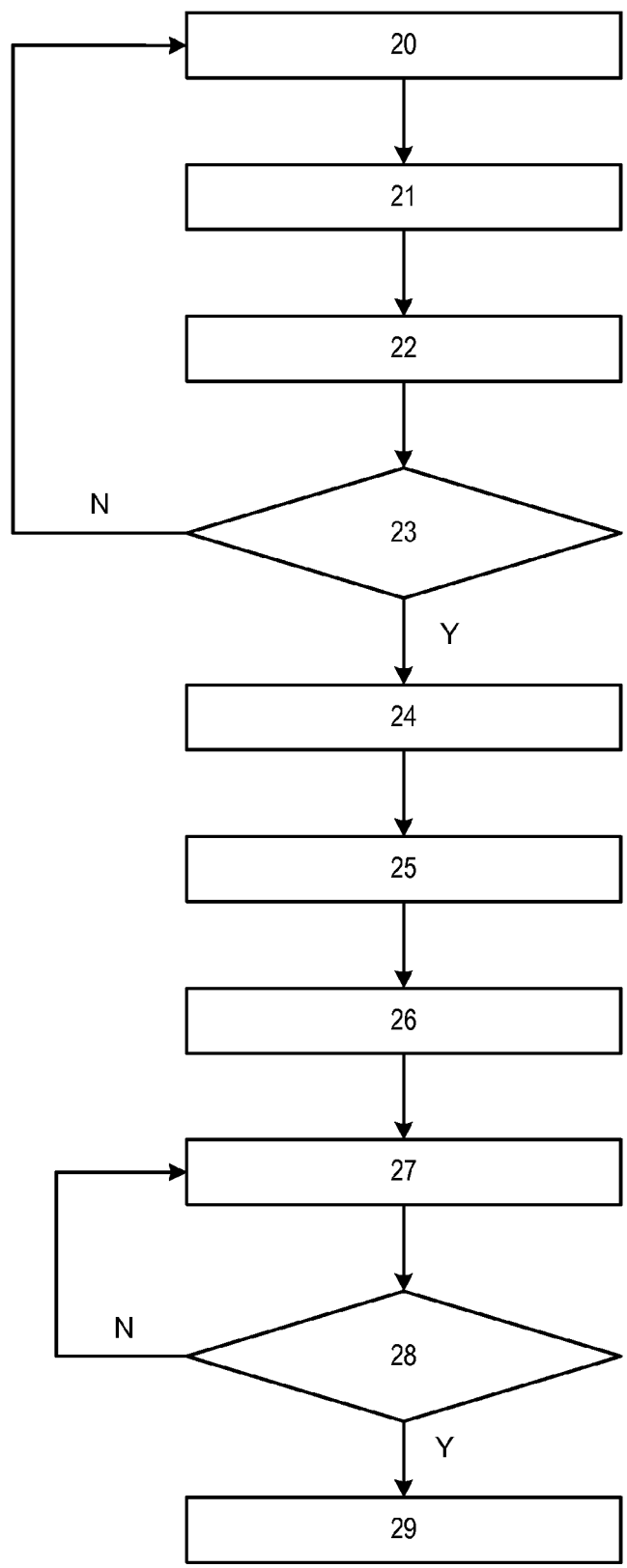
FIG. 2 is a flowchart for a method frame overrun and detection technique.

FIG. 2 illustrates a flowchart for a method for detecting frame overrun and correcting frame overrun. In step 20, incoming data from sensors and similar devices are received by the controller.

In step 21, the controller measures the task response time and determines whether a frame overrun is occurring in the controller. A task response time is defined as the time duration between the start of the task and the end of the task including all interferences such as interrupts, scheduler locking, preemption by other higher priority tasks etc. Frame overrun is determined by comparing the task response time and the period of the respective task. A task execution time is defined as the duration of time that task completes its operation without faults and interferences. A predetermined expected execution time is assigned to each task to compute workload increases. In normal execution, the task response time may vary, but should not exceed the task period.

To alleviate nuisance count overruns where the actual response time exceeds the task period by only a small number of times, thresholds are utilized. A threshold can be used to filter some measurement noises. In utilizing a threshold, a predetermined number of allowed frame overruns is assigned to each task. The threshold is preferably an integer expressing how many times a frame overruns after which the frame overrun must corrected. Alternatively, a non-integer may be used. Every time a frame overrun is detected, a count is increased for that task as a frame overrun. For some control functions, a lower amount of frame overruns are allowed due to oversampling; however when the threshold is reached, the workload must be adjusted to maintain stable control.

In step 22, the overrun count is updated based on whether the conditions are satisfied in step 21 for updating the overrun count.

In step 23, a determination is made as to whether the overrun count is greater than a count threshold. If the overall count is greater than the count threshold, then the routine proceeds to step 24. If the determination is made that the overrun count threshold is not exceeded, then the routine returns to step 20 were the controller continues to monitor for a frame overrun.

In step 24, workload efficacy is determined for each task for identifying the task introducing a largest increase of the execution time among each of the tasks. The direction is to identify the task causing the most significant increase in its execution time among all the tasks and reallocate some of its functions to other tasks running at a lower rates until the frame overrun disappears. To accomplish this, a workload factor is determined for each task. The workload factor is determined by the following formula:

$$\left( \frac{\text{current\_execution\_time}_i - \text{expected\_execution\_time}_i}{\text{expected\_execution\_time}_i} \right) \text{ for task}_i$$

where $\text{current\_execution\_time}_i$ is the actual execution time for task (i) and expected_execution_time is the predetermined execution expected for task (i).

A respective workload factor is identified for each respective task in the form of a percentage. A category is assigned to a task representing the level of the workload factor of that task. For example, for the calculated workload factor of task Tsk1 that falls within a range of 0-2%, the assigned category is "C1_Tsk1"; if the workload factor is within a range of 2%-7%, then the category is "C2_Tsk1". Similarly, if the calculated workload factor for task Tsk2 is within a range of 0%-6%, then the assigned category is "C1_Tsk2". It should be understood that the ranges as described herein are exemplary and both the ranges and assigned categories may be configured differently.

After each of the workload factors are calculated and assigned a category, a table is created that identifies the category assigned to each workload factor for each task. The table also associates a controller runtime mitigation mode for each category. The mitigation mode indicates how the functions will be distributed into different tasks. The table is illustrated as follows:

TABLE 1

| Category | T_H | Mode |
|---|---|---|
| C1_Tsk1 | Tsk1 | M11 |
| C1_Tsk2 | Tsk2 | M12 |
| C2_Tsk1 | Tsk1 | M21 |
| ... | ... | ... |

In step 25, the task with the highest workload factor is identified. The workload factor is then used to determine the category. This will uniquely identify a single entry in Table 1, which will lead to the target mitigation mode for the controller to run. As shown in the table 1, if a workload increase of 6% associated with task Tsk1 is identified as having the largest execution time change leading to the frame overrun, the category is then determined as C2_Tsk1, and therefore, the mode M21 is identified as the mitigation mode of the controller.

Figure 3:
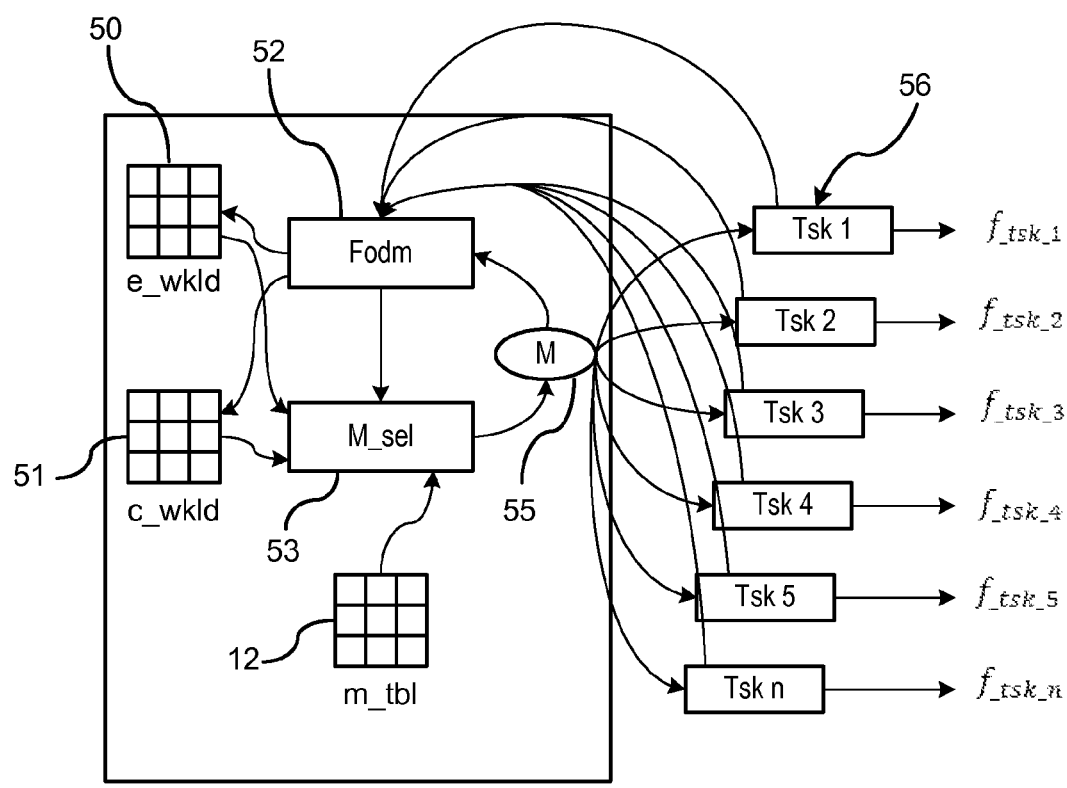
FIG. 3 exemplary block diagram for reallocating function within tasks.

In step 26, based on the identified mode, associated tasks are identified which will run respective functions, also known as runnables. Based the associated tasks that will be executed for the respective mode, functions are reallocated by executing functions in respective tasks and inhibiting functions from being executed in other tasks. FIG. 3 illustrates an exemplary block diagram for reallocating functions for relieving frame overruns. Block 50 represents an exemplary expected workload table identifying the expected workloads. Block 51 represents an exemplary expected workload table identifying the current workloads.

A frame overrun detection module 52 reviews data from both the expected workload table 50 and the current workload table 51 and identifies the respective task causing the frame overrun as described above.

A mode selection module 53 receives input from the expected workload table 50, the current workload table 51, a mode selection table 54, and the frame overrun detection module 52, and determines what mode the routine should enter for correcting the frame overrun.

In block 55, the selected mode is identified and the respective target task or tasks 56 are selected to execute for reallocating functions to other tasks for relieving the frame overrun. The target task identified will have a slower cycle time (execution time) which provides more time than the original task for receiving and processing the data. For example, if the task causing the frame overrun reads and process data every 5 msec, then the target task may read and process data every 10 msec. As a result, data is only obtained every 10 msec which not only reduces the amount of data received by the processor over a duration of time, but allows processor more time to process data that includes data from re-allocated functions.

Based on the selected mode, one or more tasks 56 are executed. The tasks include conditional operands which determine which functions should be executed and which functions should be inhibited from execution with the task. Below illustrates an exemplary task causing the frame overrun:

```
Tsk1
{
    R11( );
    R12( );
    if (not M11){
        R15( );
        R16( );
    }
    R1x( );
}
```

The following is an example of the target task that is being used to reduce the frame overrun:

```
Tsk2
{
    R21( );
    R23( );
    if (not M11 and not M12){
        R22( );
        R24( );
    }
    if (M11){
        R1x( );
        R15( );
        R16( );
    }
}
```

In the above examples, task Tsk1 is causing the frame overrun which indicates that the current processor cannot handle the amount of data being processed under the current scheme and mode M11 is identified by the mode selection module as the mode utilized to correct the fame overrun. As shown in the original task Tsk2, functions R15 and R16 are always executed unless mode M11 is enabled. Therefore, if a frame overrun is occurring caused by task Tsk1, then mode M11 is enabled and certain functions need are alleviated in task Tsk1 in order for the task to correct the frame overrun; otherwise, the task will continue to operate in a frame overrun mode. As a result, functions R15 and R16 are shifted to another task (e.g. Tsk2) which has a slower cycle time in comparison to task Tsk1.

As shown in task Tsk2, functions R15 and R16 are executed only if mode M11 is selected. That is, when mode M11 is not enabled, task Tsk2 will not execute functions R15 and R16; however, when mode M11 is enabled, task Tsk2 will execute functions R15 and R16 that were temporarily dropped from task Tsk1. This allows functions R15 and R16 which were executed every 5 msec to be executed every 10 msec. As a result, instead of dropping functions R15 and R16 completely, functions R15 and R16 are executed as part of another task at a slower cycle time which allows the functions to still be executed and allows the frame overrun associated with task Tsk1 to correct itself since it temporarily has less functions to execute.

It should also be noted that in task Tsk2, in order take on extra workload of functions R15 and R16, functions R22 and R23 are not executed in task Tsk2 while mode M11 is enabled. These respective functions are re-allocated to another task, for example Tsk3, so that task Tsk2 does not get behind and cause a frame overrun due to the additional workload of functions R15 and R16. Therefore, as opposed to dropping functions R22 and R23, these functions are re-allocated to another task Tsk3 operating at a cycle time slower than task Tsk2. If the frame overrun has not corrected itself, Tsk3 may re-allocate functions to a next slower cycle time task. This will continue until the frame overrun is corrected with respect to the task originally causing the frame overrun which is task Tsk1.

Once the frame overrun is corrected, the system will restore itself to the original configuration. As are result, the respective mode will be deselected, and each task will operate according to the original configuration prior to the frame overrun. The task structure is defined offline through analysis during the design stages of the controller. As a result, all re-allocation of functions to another task is pre-conceived and is thoroughly analyzed prior to implementation in the controller. The table below illustrates an example of reallocation table that illustrates the affected mode, the affected task (task_source), the respective functions in the task that are affected in the reallocation (runnables), and the target task (task_target) that the affected functions will be re-allocated to:

TABLE 2

| Mode | T_src | Runnables | T_tgt |
|------|-------|-----------|-------|
| M11  | Tsk1  | R15, R16  | Tsk2  |
|      | Tsk2  | R22, R24  | Tsk3  |
| M12  | Tsk2  | R22, R24  | Tsk4  |
| ...  | ...   | ...       | ...   |

Referring again to FIG. 2, in step 27, as described in the paragraphs above, respective functions are re-allocated in other tasks while the frame overrun is present. So long as a respective mode is identified, respective features within respective tasks may or may not be executed under the conditions set forth therein.

In step 28, a determination is made whether the frame overrun is corrected. If the frame overrun is not corrected, then a return is made to step 27 to continue to re-allocate functions among tasks based on the identified mode. If the determination is made in step 28 that the overrun is not corrected, then the routine proceeds to step 29 where the system is restored to its original configuration when no frame overrun is present. Restoration to its original configuration is performed by deselecting the respective mode chosen to correct the frame overrun. As a result, the re-allocation scheme is enabled and configured based on a respective mode identified by the mode selection module. The conditions set forth in each task are predetermined at design time, and the determination of which functions to execute or not execute in each task is set forth by the mode currently enabled.

That advantage described herein is an execution scheme that is predetermined for re-allocating functions within a controller for correcting frame overrun without having to drop functions permanently. The functions are reallocated but rather re-allocating functions to a different cycle time to alleviate workloads within a respective task causing the frame overrun, which allows the task to catch up to its current workload. The re-allocation of functions to a next slower cycle time should not be noticeable to user of the system such as a driver of a vehicle, since the functions are still executed, but just executed temporarily at a next slower time interval.

While certain embodiments of the present invention have been described in detail, those familiar with the art to which this invention relates will recognize various alternative designs and embodiments for practicing the invention as defined by the following claims.

What is claimed is:

1. A method of adaptively reconfiguring controller functions during a frame overrun, the method comprising the steps of:
    detecting a frame overrun condition by:
        increasing an overrun count for a respective task each time a frame overrun condition is detected for a respective task; and
        determining that the overrun count exceeds a count threshold;
    identifying which respective task from a plurality of tasks is a largest contributor to the frame overrun;
    identifying a mitigation mode associated with the identified task to correct the frame overrun; and
    reallocating functions within the identified task to a second task until the frame overrun condition is corrected, wherein reallocated functions within the respective task are identified as a function of the identified mode.

2. The method of claim 1 wherein the overrun count is increased in response to a current execution time exceeding a task period.

3. The method of claim 1 wherein the overrun count is increased in response to an actual execution time being larger than a task period a respective number of times during a predetermined duration of time.

4. The method of claim 1 wherein identifying which respective task from a plurality of tasks is a largest contributor includes comparing an actual execution time for each task to an expected execution time for each task.

5. The method of claim 4 wherein comparing the actual execution time for each task to the expected execution time for each task further comprises the steps of:
    calculating a difference between a current execution time and the expected execution time for each task;
    calculating a percentage by dividing the difference by the expected execution time for each task; and
    identifying a workload factor having a largest percentage among the plurality of tasks.

6. The method of claim 5 further comprising the step of identifying a category for the workload factor of each task.

7. The method of claim 5 wherein a plurality of percentage ranges of the workload factor are mapped to respective categories.

8. The method of claim 1 wherein a mode selection module identifies which mode is affected for reallocating functions to other tasks.

9. The method of claim 8 wherein the mode selection module receives input from an expected workload table, from a current workload table, from a frame overrun detection module, and from a mode selection table for identifying the mode for reallocating functions to other tasks.

10. The method of claim 8 wherein each task includes a routine for executing functions within the task.

11. The method of claim 10 wherein the task include conditional operands that determine whether to inhibit a first set of functions identified in the task based on the identified mode from the mode selection module.

12. The method of claim 11 wherein the task identified as the largest contributor to the frame overrun includes conditional operands for inhibiting execution of the first set of functions, wherein the first set of functions are reallocated to a second task for execution of the first set of functions.

13. The method of claim 12 wherein second task operates at a slower cycle time in comparison to the task identified as the largest contributor.

14. The method of claim 13 wherein the second task includes conditional operands for inhibiting execution of a second set of functions during the frame overrun, wherein the second set of functions are reallocated to a third task while the frame overrun is occurring, wherein the third task operates at a slower cycle time in comparison to the task form which the functions were reallocated.

15. The method of claim 14 wherein a respective task including conditional operands for inhibiting a respective set of functions based on a respective mode enabled reallocates the respective set of functions to a next respective task for execution.

16. The method of claim 15 wherein the next respective task identified for reallocating functions operates at a slower cycle time in comparison to the respective task from which the functions were reallocated.

17. The method of claim 1 further comprising the step of: determining the frame overrun condition is corrected; and disabling the identified mode associated with the frame overrun in response to correcting the frame overrun condition.

18. The method of claim 17 wherein reallocating functions to other tasks is discontinued in response to disabling the identified mode.

* * * * *